United States Patent [19]

Bray et al.

[11] Patent Number: 4,842,724
[45] Date of Patent: Jun. 27, 1989

[54] WATER PURIFICATION APPARATUS

[75] Inventors: Donald T. Bray, Escondido; Richard A. Simonis, San Diego, both of Calif.

[73] Assignee: Nimbus Water Systems, Inc., Escondido, Calif.

[21] Appl. No.: 227,694

[22] Filed: Aug. 3, 1988

[51] Int. Cl.⁴ .............................................. B01D 13/00
[52] U.S. Cl. ..................... 210/104; 210/135; 210/172; 210/257.2; 210/416.2
[58] Field of Search ............... 210/86, 87, 90, 91, 210/92, 93, 97, 100, 104, 117, 119, 130, 134, 135, 136, 172, 195.2, 252, 257.1, 257.2, 260, 261, 262, 321.6, 416.1, 416.3, 420, 422, 424, 105, 97, 109, 143

[56] References Cited

U.S. PATENT DOCUMENTS

| | | | |
|---|---|---|---|
| 4,169,789 | 10/1979 | Cerat | 210/257.2 |
| 4,752,389 | 6/1988 | Burrows | 210/257.2 |
| 4,770,770 | 9/1988 | Regunathan | 210/257.2 |
| 4,773,991 | 9/1988 | Aid | 210/257.2 |

Primary Examiner—Frank Sever
Attorney, Agent, or Firm—Fitch, Even, Tabin & Flannery

[57] ABSTRACT

Self-standing apparatus for filtering supply water to provide purified water includes a base subassembly and two container subassemblies. One container subassembly provides supply water to filtering apparatus located in the base subassembly. The second container holds purified water which passes through a semipermeable membrane filter in the base subassembly. Concentrate from the membrane filter flows back to the supply water container for ultimate recirculation. The base subassembly and the container subassemblies have automatically closing valves which render each container water-tight when separated from the base subassembly, and which open to provide communication between the containers and filtering apparatus within the base subassembly.

13 Claims, 3 Drawing Sheets

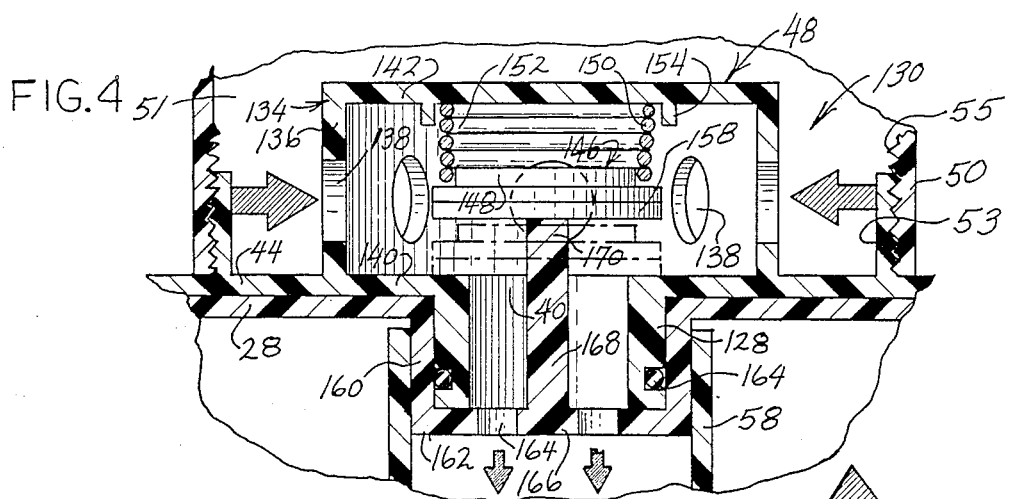
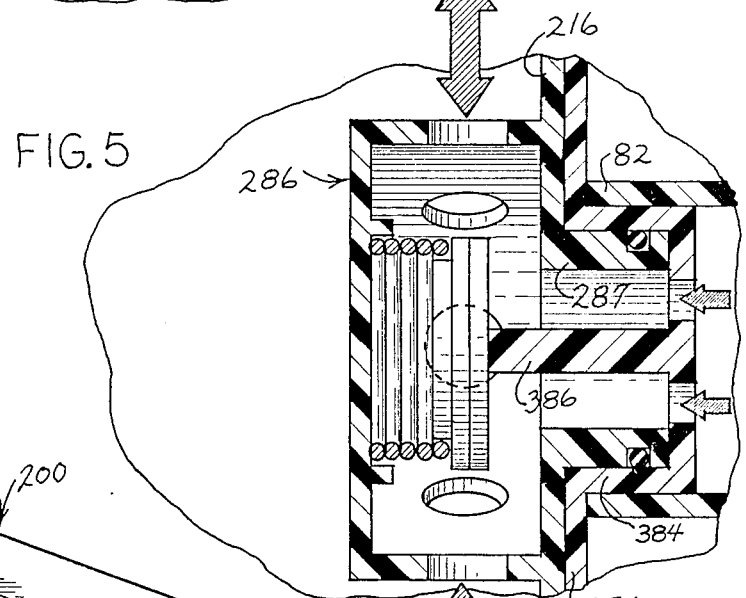
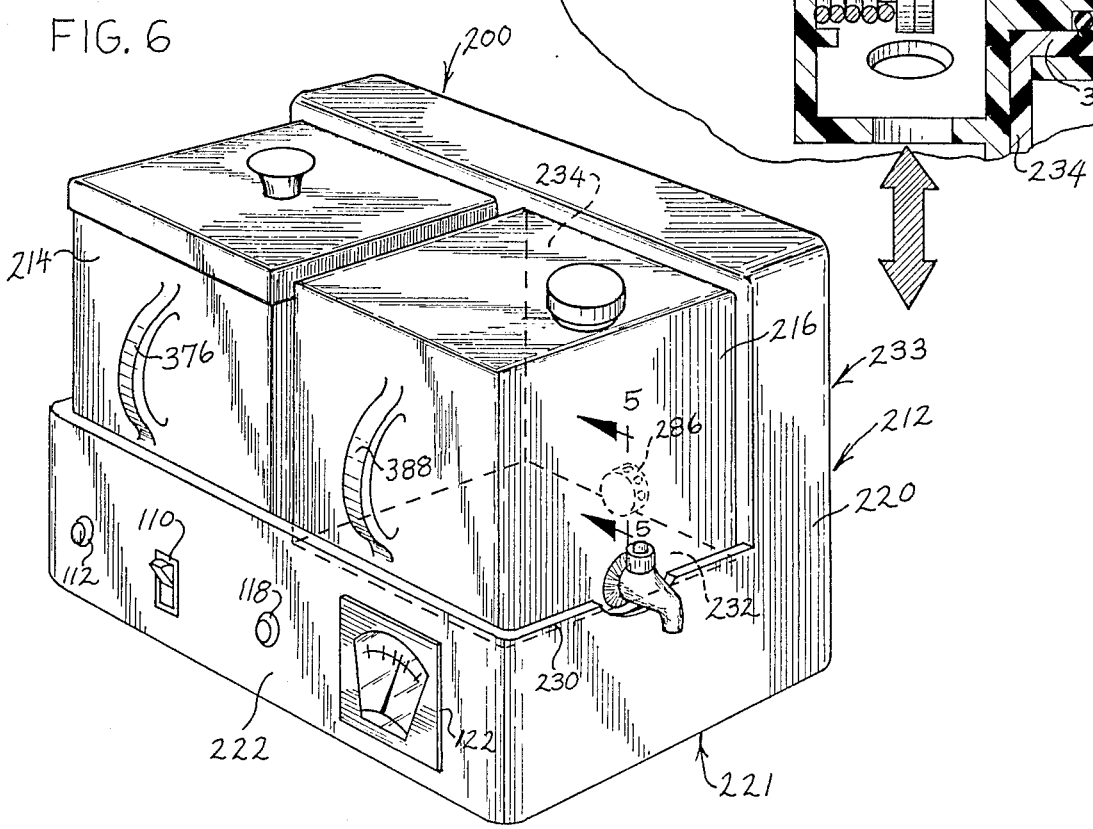

WATER PURIFICATION APPARATUS

BACKGROUND OF THE INVENTION

1. Field of the Invention

The present invention pertains to water purification systems and more particularly pertains to such systems adapted for domestic use.

2. Description of the Related Art

Previous systems have been proposed in the past for providing purified water to a domestic user. One use for such purification systems is to provide a supply of purified drinking water. Some early domestic systems had a filtration apparatus disposed on the countertop, adjacent a sink. A connection was made to the sink faucet to obtain a supply of water to be purified and an outlet from the apparatus was placed in the sink to discharge the brine or concentrate and impurities. Examples of this type of water filtration are given in U.S. Pat. Nos. 3,746,174, 3,822,018, 4,609,463 and 4,713,175. Apparatus of this type blocked access to the sink area and also interfered with the use of the sink faucet.

In a second type of system these problems were overcome by mounting the filtration apparatus under the counter where the sink is located. Examples of water filtration systems directly connected to plumbing and piping systems are given in U.S. Pat. Nos. 4,218,317 and 4,540,489. A third example of water purification systems of this type is given in U.S. Pat. No. 4,711,723 which has a base which can stand upon a horizontal support surface but the water purification apparatus nonetheless requires piping connections to a source of tap water and to a drain for impure water discharge. These systems all require substantial plumbing changes to install connections to the water piping and the drain for the sink. More recently, filtration apparatus has been provided which mounts directly onto the sink faucet. However, access to the sink faucet is obstructed when the filtration apparatus is installed. Accordingly, there is still room for improvement to water filtration units, especially filtration units for domestic use at a kitchen sink or the like.

SUMMARY OF THE INVENTION

It is an object of the present invention to provide an improved water filtration apparatus which is freestanding, suitable for location on a counter top and which does not require connections to a sink faucet or drain.

Another object of the present invention is to provide a filtration apparatus of the above-described type having a base in which filtration components are mounted, and containers for a water supply and for purified water which can be removed from the base and carried to remote locations.

A further object of the present invention is to provide a filtration apparatus of the above-described type having an electrically driven pump in the base portion with the only required point of connection to the filtration apparatus being an electrical cord and plug receivable in an electrical outlet socket.

These and other objects according to the present invention which will become apparent from studying the appended description and the accompanying drawings are provided in an apparatus for providing purified water for drinking purposes. The apparatus comprises a base compartment containing a pump, with electrically powered drive means connected to the pump. A semipermeable membrane-containing water treatment device having an inlet, a pure water outlet, and a concentrate outlet is also included. Two supply containers are used, a supply container for holding a quantity of tap water or the like, and a purified water container. The containers are adapted to be supported atop the base compartment.

Detachable first connection means in the upper surface of said base compartment and in the undersurface of the supply container allow liquid to flow from the supply compartment to the base. First conduit means connect the first connection means to the suction side of the pump, and connection is made from the pump discharge to the inlet of the water treatment device.

Detachable second connection means interconnect the base and the supply container for returning concentrate to the supply container. Second conduit means connect the second connection means to the concentrate outlet from the treatment device.

Detachable third connection means interconnect the purified water container and the base compartment so as to permit the flow of purified water therebetween. Third conduit means connect the third connection means to the purified water outlet from the treatment device.

The first, second and third connection means each contain automatically closing valve means which prevent outflow of liquid therethrough upon separation of the respective container from the base compartment. Means are provided for halting operation of the pump drive means to prevent the concentration of impurities in the water being supplied to said pump exceeding a certain predetermined level.

The embodiment of the invention described above preferably has water-tight valves located in a horizontal bottom wall of a container so that the valves are automatically operated by positioning the container atop the base. The valves may, however, be relocated to a generally vertical rear wall of the container so as to contact a rear wall of the base unit. Water-tight valve components may then be located in the rear wall of the container and in the generally upright rear wall of the base to provide mating water-tight engagement as the container is pushed rearwardly in a generally horizontal direction toward the rear wall of the base.

The valve components associated with the containers are preferably spring-operated. To ensure that the valve springs do not interfere with the mating water-tight engagement between the valve components of the container and the base, interlocking arrangements are provided to maintain a secure engagement between the base and the container. In the embodiment of the filter apparatus, where the valves are mounted in a bottom wall of the container, snap-lock fingers extend upwardly from the base to engage sidewalls of the container, maintaining an intimate water-tight engagement between the valve components on the bottom wall of the container and the top wall of the base. In the embodiment where the valve components are mounted in the rear wall of the container and the generally upright rear wall of the base, an upstanding lip of the base is provided, forming a generally concave recess for receiving a bottom portion of the container engaging the forward corner of the container to prevent its forward direction under force of the valve springs in the container.

BRIEF DESCRIPTION OF THE DRAWINGS

In the drawings, wherein like elements are referenced alike,

FIG. 4 is a fragmentary cross-sectional view of one of the detachable connections between a container and the base;

FIG. 5 is a fragmentary cross-sectional view of an alternative detachable connection installed in the back wall of the alternative base of claim 6; and FIG. 6 is a perspective view of an alternative embodiment of filtration apparatus according to the present invention.

DETAILED DESCRIPTION OF THE PREFERRED EMBODIMENT

Figure 1:
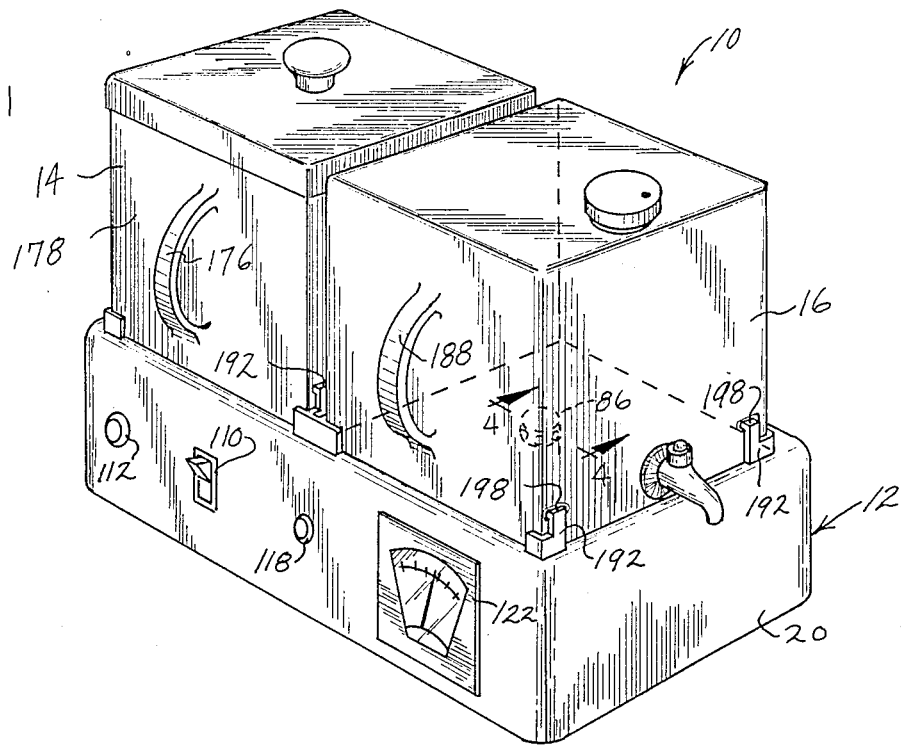
FIG. 1 is a perspective view of water filtration apparatus illustrating aspects of the present invention.
Figure 2:
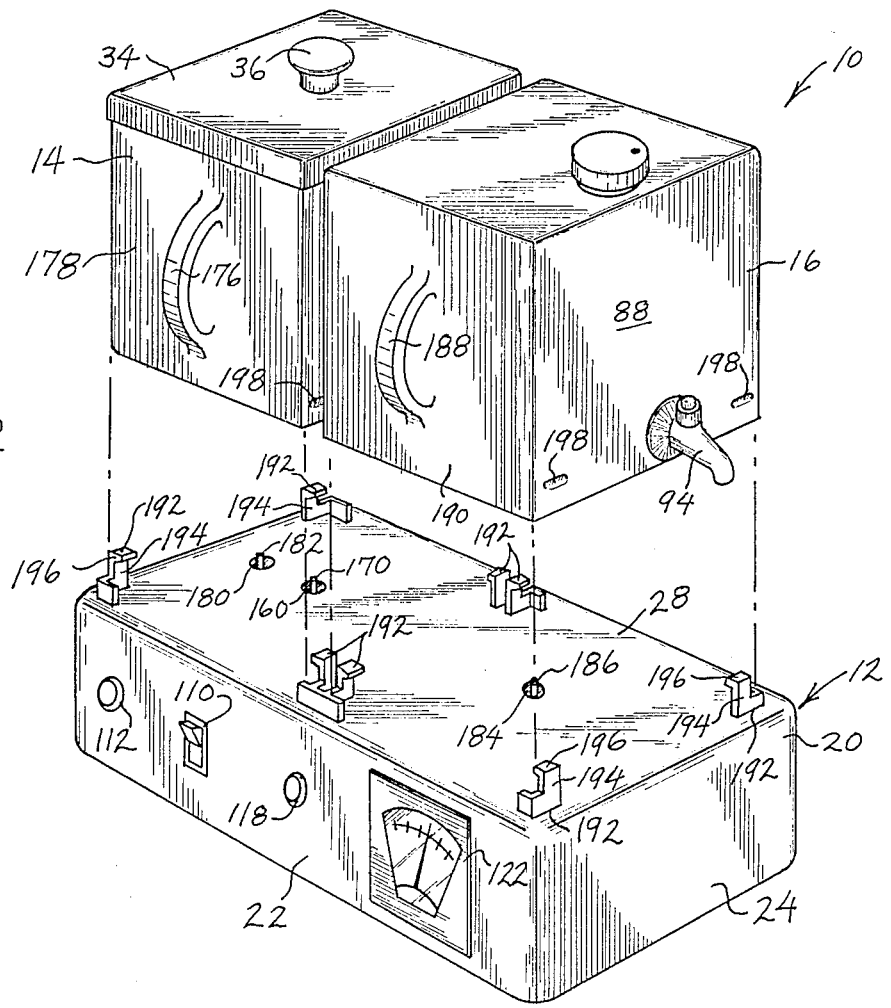
FIG. 2 is an exploded perspective view showing the water supply container and purified water container separated from the base in preparation for transit to a remote location.

Referring now to the drawings, and especially to FIGS. 1 and 2, a counter top water filtration apparatus is generally indicated at 10. Apparatus 10 is a self-standing unit suitable for installation on a counter top or other location including locations remote from the sink. As will be seen, the filter apparatus includes an electrically driven pump. The motor for the pump can be powered either from storage batteries in which case the filtration apparatus will be capable of completely independent operation, or the electric motor can be powered by connection to an electrical outlet in which case an electrical supply wire and plug is the only connection needed to systems outside of the filtration apparatus.

The filtration apparatus in its prominent aspects includes three major subassemblies: a base unit 12, a water supply container 14, and a purified water container 16. The water containers 14,16 are separate and independent from one another and as indicated in FIG. 2, are removable from base 12 for transport to a remote location. For example, the pure water container 16, when filled, may be removed to a refrigerator for later use, and the water supply container 14 may be carried to a water source to replenish the supply of water to be filtered. As will be seen, detachable water-tight connections for water flow between the water containers and the base are provided.

Figure 3:
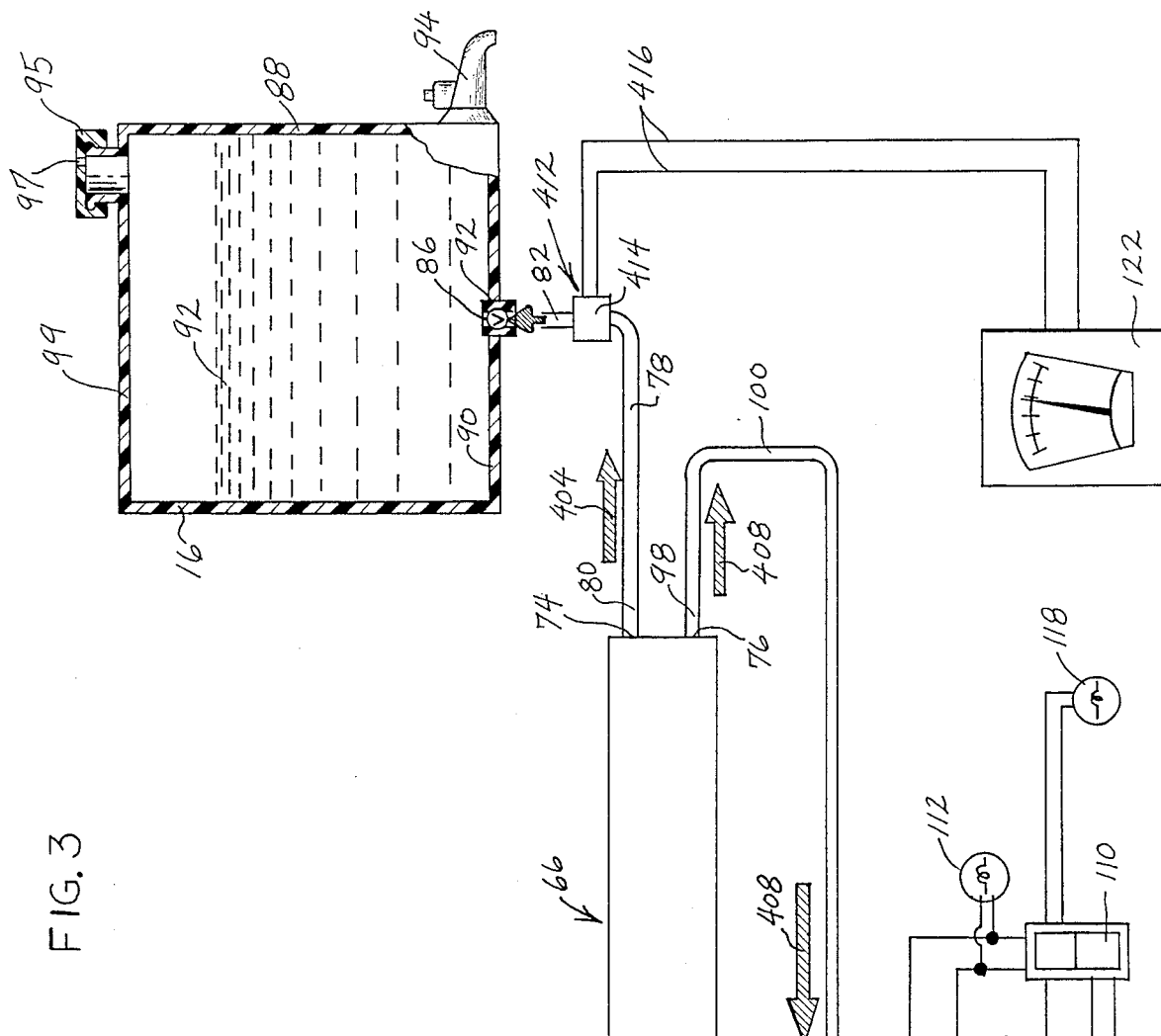
FIG. 3 is a schematic diagram of a water filtration apparatus illustrating components contained within the base in greater detail.

Referring now to FIG. 3, the components of the filtration apparatus will be described in greater detail. In the schematic diagram of FIG. 3 all of the components of apparatus 10, other than the water supply container 14 and the pure water container 16 are contained within the base unit 12 which includes a housing 20 having a front wall 22, three sidewalls 24 and a bottom wall 28. Together, the walls of the housing define an enclosed chamber within which components of the filtration apparatus are located. The housing 20 is preferably made of molded plastic so as to provide a waterproof protection for the electrical components contained therewithin. However, housing 20 may also be made of other commonly available materials, if desired. The water supply container 14 and pure water container 16 are also preferably made of plastic material so as to be lightweight and relatively soft so as not to scratch or mar a kitchen counter top, refrigerator shelving or other locations in the home where the containers might be placed.

Referring now to FIG. 3, container 14 is filled with water 32 to be processed by the filtration apparatus. The water 32 may be conveniently provided from a sink faucet, or other, perhaps larger, water storage vessels or other convenient water sources. The container 14 includes a removable lid 34 and a knob 36. When removed, the lid 34 exposes an upper opening 37 of container 14 of an ample size to allow the ready insertion of water in container 14 by pouring or by filling from a faucet or spout. With lid 34 installed, container 14 is entirely enclosed and essentially watertight except for two openings 40,42 in its bottom wall 44. A separable connection, preferably in the form of a spring-loaded valve 48, is installed in opening 40 to retain water in the container and to provide, on demand, water flow to a downstream filtration module.

As illustrated in FIG. 3, a standpipe or extension tube 50 surrounds the valve 48 and cooperates with the bottom portion of container 14 to provide a reservoir for concentrated brine from the filter module. The mechanism of valve 48 will be described in greater detail herein, with reference to FIG. 4. A second valve mechanism 52 of the check valve type is installed in the other aperture 42 and allows flow only upward into the container 14.

A conduit 56 has a free end 58 communicating with the valve 48. The other end 60 of conduit 56 is connected to the inlet portion of a pump 62. Conduit 56, when connected to valve 48, provides source water 32 to the inlet of pump 62, for circulation in a filter module generally indicated at 66. The discharge 68 of pump 62 is connected through a conduit 70 to the inlet portion 72 of the filter module. The filter module has a purified water outlet 74 and a brine or concentrated water outlet 76.

Filter module 66 may comprise any filter arrangement suitable for treating drinking water and generally will have an average pore size of about 0.5 micron or less. Preferably, a polymeric semipermeable membrane is used, such as an ultrafiltration or reverse osmosis membrane, and more preferably a reverse osmosis membrane filter module is used of the general type disclosed in U.S. Pat. Nos. 3,367,504 or 3,397,790, commonly assigned, the disclosure of which is herein incorporated by reference. The filter module 66 can, of course, include multiple stages as required to filter different types of impurities which may be present in a particular water supply. The filter module 66 directs the inlet water to flow through the semipermeable membrane under the pressure of pump 62. Water flowing through the membrane becomes the pure to concentrate outlet 76 by water which does not flow water product appearing at outlet 74 and preferably most of the dissolved soluble salts, organic molecules, and substantially all of the particulate matter is carried through the membrane. It is expected that, by using reverse osmosis membranes of the type described in U.S. Pat. Nos. 3,367,504 and 3,397,790, between 20 and 80% of the supply water can be extracted before significant scaling in the reverse osmosis membrane develops.

A conduit 78 has a first end 80 connected to a pure water outlet 74 of filter 66. The opposed free end 82 of conduit 78, as will be seen, communicates with the pure water container 16 through a separable connection device, preferably a check valve 86 similar to the valve 52 of the water supply container. The pure water container 16 includes a sidewall 88 and a bottom wall 90 in which is formed an aperture 92, the valve 86 being received in the aperture. Purified water or product 92 is accumulated in container 16 and may be withdrawn therefrom by a spigot 94 installed in the lower end of sidewall 88, adjacent bottom wall 90. Also included in container 16 is a cap 95 having a vent hole 97 and installed in the top wall 99 of the container. In one practical embodiment the cap had a diameter ranging between one and two inches with the air vent opening ranging between 1/16th and ⅛th inch diameter.

The concentrate exiting outlet 76 enters the upstream end 98 of a conduit 100, emerging at the opposed free end 102. Conduit 100 is connected to the spring-loaded valve 52 and, under the pressure of pump 62, enters the bottom of container 14, mixing with the remaining supply water 32 therein. Pump 62 is preferably electrically powered by an electric motor 63 incorporated in the pump. Pump 62 receives electrical energy through conductors 106,108 which are connected to an on-off switch 110. Electric supply to the filter apparatus 10 is connected to terminals 113,114. As mentioned above, the source for electrical power may be obtained from a storage battery, but preferably comprises household current provided at a conventional convenience outlet.

An electrical plug (not shown), mateable with the electrical outlet, is electrically connected to terminals 113,114 and power therefrom is switched on and off at switch 110. When switch 110 is turned on so as to apply power to the electrical components of apparatus 10, an indicator light 112 is illuminated to indicate that the apparatus is electrically energized. A solenoid 116 interrupts the electrical supply to pump motor 63 upon a predetermined condition, as will be explained below. When power is supplied to pump motor 63, indicator light 118 is illuminated to indicate that the pump is in operation. A meter 122 provides an indication to the user of the degree of purity of the product water. Referring briefly to FIG. 6, the indicator lights 112,118, the on-off switch 110 and the meter 122 are conveniently mounted on the front wall 22 of housing 20.

Referring now to FIG. 4, valve 48 is mounted in the bottom wall 44, of container 14, in communication with an aperture 40 forming an opening in the bottom wall. Preferably, the aperture 40 is an integral feature of the molded plastic container 14 wherein a cylindrical stub portion 128 extends downwardly from the bottom wall 44 to form a plug-like portion of a detachable connection apparatus generally indicated at 130, in which valve 48 is incorporated.

The valve 48 includes a housing 134, generally cylindrical in configuration, projecting upwardly into the interior of container 14. Housing 134 has a cylindrical sidewall 136 in which a plurality of apertures 138 are formed to provide water flow communication with the interior of container 14. Sidewalls 136 overlay and enclose a portion 140 of bottom wall 44. A disc-like top wall 142 encloses the top of housing 134.

A movable valve member generally indicated at 146 includes a rigid disc 148 preferably metal or plastic, having a stepped outer wall 150. The valve disc 148 is resiliently urged toward the bottom wall portion 140 by a spring 152, held in place against the top wall 142 by mounting ring 154, downwardly extending from the top wall 142. A layer 158 of resilient gasket material is secured to the face of valve disc 148 by adhesive or the like and provides watertight sealing communication with the bottom wall portion 140 surrounding aperture 40. Normally, the spring 152 provides sufficient pressure to press the resilient gasket 158 against bottom wall portion 140 as indicated in phantom in FIG. 4, so as to maintain watertight sealing engagement therewith.

The upper wall 28 of housing 20 has a recessed socket member 160 of generally cylindrical configuration. The socket member includes a bottom wall 162 in which a series of apertures 164 are spaced about a central portion 166. A post 168 having a free end 170 extends upwardly from the central portion 166. The post 168 is proportioned so that its free end 170 extends above the top wall 28 so as to protrude into the valve housing 134. Post 168 deflects the valve member 146 so as to establish communication between the water supply container 14 and the conduit 56 when the container 14 is mated to the base module 12.

The stub portion 128 includes an inwardly directed annular recess in which is mounted an O-ring 164. When stub wall 128 is received within socket 60, the O-ring 164 is compressed between the stub portion and the sidewall of the socket so as to provide a watertight sealing engagement restricting the outflow of water to the conduit 56. FIG. 4 illustrates the preferred embodiment of conduit 56 comprising a hose, preferably of resilient material, having a free end 58 fitted over the cylindrical sidewalls of socket 160 so as to provide an economical watertight sealing engagement therewith.

As can now be seen, when container 14 is mounted atop base module 12, a flow communication is automatically established between the interior of the container and the conduit 56. By grasping the handle 176 on the front wall 178 of container 14, the container may be disengaged from base module 12, when the post 168 is withdrawn from its contact with the valve element 146, the valve closes under the pressure of spring 152.

The valves 52 and 86 may also have a spring-loaded construction; however any suitable check valve 48 may be used. The top wall 28 of housing 20 includes a recess 180 and an upwardly extending post 182 to provide mating communication with the valve 52 of container 14. The recess 180 and post 182 are substantially identical to the recess 160 and post 170 described above with reference to FIG. 4. Top wall 28 also includes a socket 184 and an upstanding post 186 substantially identical to the socket 160 and post 170. By grasping the handle 188 on the front wall 190 of pure water container 16, the container may be disconnected from base module 12 with the spring-loaded valve 186 automatically closing in the manner described above with reference to the identical valve 48. The end 82 of conduit 78 and the free end 102 of conduit 100 also comprise flexible hoses fitted over the structures of sockets 184,180 to provide watertight sealing.

The springs of the valves 48,52 may in some instances have sufficient force so as to slightly displace the containers from the watertight sealing engagement between their plug portion and the mating socket portions of the base module. Accordingly, spring locks 192 are mounted to base module 12. The locks preferably comprise integral molded upright extensions of the housing 20, with upright legs 194 terminating in a camming edge 196. Referring to FIG. 2, the containers include socket-like depressions 198 for receiving the spring-loaded camming edges 196. If desired, the locks 192 can include corner portions for receiving and thereby orienting outside corners of the containers.

When the containers are lowered into mating engagement with base unit 212, the camming edges 196 of the locks slide over the outside walls of the container, being received in recesses 198 when the containers are in a fully mated and sealed condition with respect to the base unit. The fully locked interengagement between the locks 192 and the recesses 198 is illustrated in FIG. 1. The spring locks 192 counteract the upwardly directed forces of spring elements of the valves mounted to the bottom wall of the containers, thereby assuring watertight engagement between the containers and the base unit 12.

The pump 62 maintains a circulating flow through the filter with the concentrate exiting at outlet 76, and flowing through conduit 100 in the direction of arrow 408. The concentrate emerges from the free end 102 of the conduit, passing through valve 52 into the water supply container 14, where it becomes diluted by mixing with the remaining supply water. With continued operation of the filtration apparatus, the water being circulated through the filtration module becomes slightly higher in its concentration of soluble salts.

In practice, the filtration module 66 is chosen for a particular quality of supply water available to users. However, since the exact quality of supply water can vary somewhat, even over a fairly small geographical market, anticipated operation of the filtration apparatus and particularly the filtration module is chosen based upon average figures. The acceptable concentration of soluble salts in the supply water container can also be calculated, and according to one aspect of the present invention, steps are taken to avoid supplying water having undesirably high salt concentrations, since filtration efficiency decreases with increasing concentration.

Referring to FIG. 3, extension tube 50 cooperates with the lower portion of container 14 to form a reservoir 51, equal to the water level in container 14 drops below the top of the extension tube; the induction of water into the filtration module halts when this level is reached. The reservoir 51 has a known area and a depth corresponding to the height of the extension tube. Approximate concentration in reservoir 51 can be calculated based upon an estimated or predicted supply water quality.

Since the quality of the supply water available to users can vary somewhat, it is desirable to provide a means for adjusting the amount of concentration which will be permitted by the filter apparatus. This can be done by adjustably controlling the volume of the reservoir 51, which is present when supply water ceases to be inducted into the pump 62. According to one aspect of the present invention, it has been found convenient to provide a releasable mounting of the extension tube 50 to the bottom wall 44 in container 14. Referring to FIG. 4, a threaded collar 53 extends upwardly from bottom wall 44. The threads of collar 53 are external, formed in the outer cylindrical surface of the collar. The inner surface of extension tube 50 carries threads 55 which matingly engage with the collar 53 to form a releasable securement of the extension tube to the container.

According to one aspect of the present invention, a number of extension tubes of varying lengths are provided with the filtration apparatus so that a user can adjust the size of reservoir 51, thus changing the maximum concentration of supply water that will be allowed by the filtration apparatus. For example, if the reservoir of FIG. 3 is too small so that undesirably high salt concentrations are reaching the filter module 66, a longer tube is installed. In addition to decreased deficiency of filtration, high salt concentrations can result in an increased formation of scale within the filter module thus impairing filtering efficiency even further. Although the scale can oftentimes be removed by simply flushing vinegar or the like through the filter module, it is desirable that the need for this attention be reduced as much as possible or eliminated.

A user of the filtration apparatus can, by unscrewing the extension tube 50 from the threaded collar 53, replace the extension tube with one of greater length to thereby increase the volume of the reservoir 51 and reduce the salt concentrations recirculated through the filter module 66. Also, extension tube 50 could be replaced with a shorter extension tube to decrease the volume of the reservoir to provide additional purified water from each filling of container 14. Care must however be taken so as not to decrease the volume of the reservoir to a point where increased impurity concentrations create a problem.

Referring to FIG. 3, an electrical conductivity test device 420 is installed at the outlet of container 14. The device 420 measures the conductivity of water passing through conduit 56 and thus can provide a measure of salt concentration in the water based upon the electrical conductivity thereof. The principal use of the test device 420 is to provide an automatic shut-off of the filtration apparatus when the supply water level in container 14 has reached the top of extension tube 50. A signal at the output of the test device is transmitted along conductors 422 to a shut-off solenoid which interrupts the electrical energization of pump 62. If desired, the device 420 or a similar device located adjacent the device 420 can be used as a back-up to provide a "trip" signal should the salt concentration reach a certain threshhold even though the minimum water level in container 14 has not yet been reached. Thus, a second alternative arrangement for limiting the salt concentration in the filtration apparatus is shown which can be provided either together with, or to the exclusion of, the extension tube arrangement.

Turning now to FIG. 6, an alternative embodiment of the filtration apparatus is generally indicated at 200. The filtration apparatus is in many ways substantially identical to apparatus 10. One exception is the configuration of the base module 212, which includes a housing 220 preferably of molded plastic material. The housing includes a bottom section generally indicated at 221 including a front wall 222 in which are mounted the indicator lights 112,118, the switch 110 and meter 122. The housing 220, unlike the housing 20 of filtration apparatus 10, has a peripheral lip 230 extending above a recessed top wall 232. Housing 220 further includes an upright rear panel 233 with a front wall 234 extending upwardly from the top wall 232.

The containers 214,216 of the alternative embodiment are similar to the containers 14,16, described above except that the spring-loaded valves are mounted on the vertically extending rear walls of those containers, generally opposite the handles 376,388, rather than their horizontal bottom walls. The sockets and upwardly extending posts mounted in the top wall of base unit 212 have accordingly been relocated to the rear panel 233. As illustrated in FIG. 5, a valve 286 has a plug portion 287 received in a socket 384 formed in the front wall 234 and a post 386 extends in a generally horizontal direction, with a free end protruding beyond the front wall. By grasping the handle 388, a user mates valve 286 to socket 384 with a generally horizontally directed motion in which the valve disc of valve 286 is displaced in a horizontal direction as indicated in FIG. 5, to allow a flow communication between the interior of container 216 and the free end 82 of conduit 78.

The upwardly extending peripheral lip 230 prevents unintentional dislocation of the containers 214,216 and their watertight connection with base module 212. For example, the peripheral lip 230 prevents a forward directed displacement of container 216 under the force of the spring loaded valve 286 which urges the container in a forward direction.

To install container 216, a user grasps handle 388 and establishes contact between the rear bottom portion of the container and the top wall 232 of housing 220. The container 216 is then pushed in a rearward direction bringing valve 286 into watertight mating engagement with the socket 384. With the valve and socket fully mated, clearance is provided between the front wall of container 216 and the upstanding peripheral lip 230, allowing the front corner of container 216 to be lowered into the recess area within the peripheral lip. The filtration apparatus 200 of FIG. 6, is accordingly provided with a ready, visual and tactile indication of the mating condition of the valves within its containers.

As indicated in the perspective view of FIG. 6, the valve 286 is located adjacent the bottom wall 232 of the container 216. The valves in container 214, although not visible in the FIGURES are similarly positioned with respect to the bottom wall of that container. Accordingly, since the valve for the water supply to the filtration apparatus is spaced some small distance about the bottom wall of the container, a reservoir forms at the bottom of the container when the water level drops below the level of the intake valve. If the reservoir should prove to be of insufficient size, the valve can be enclosed by an upwardly extending tube, the length of which can be adjusted to provide the depth required for a desired reservoir size.

It is expected that, using reverse osmosis membranes of the type described in U.S. Pat. Nos. 3,367,504 and 3,397,790 between 20 and 80% of the supply water can be extracted as purified drinking water before significant scaling in the reverse osmosis membrane develops. If desired, the water supply container 14 can be slightly oversized and the height of the tubular extension 50 adjusted to provide a reservoir at the bottom of container 14 below the top of tube 50, sized appropriately to reduce the amount of scaling in the membrane to a minimum.

Alternatively, the intake valve in container 214 can be surrounded by upstanding walls which form a pocket around the intake valve having an upper edge disposed thereabove. The height of the pocket-forming walls can be adjusted to provide a reservoir of the desired size. As an alternative to structures surrounding the intake valve and extending thereabove, a conductivity test device such as the device 420 of FIG. 3 can be employed to electronically sense a threshhold salt level at which a signal is sent to a shut-off solenoid to deenergize pump 62. This latter shut-off arrangement could be used independent of minimum water level determining structures surrounding the intake valve, such as a riser tube or the like, or in combination therewith.

Referring now to FIG. 3, except for changes in configuration of the containers, the schematic diagram applies equally well to the filtration apparatus 200, the components contained within the bases of the two embodiments preferably being identical to each other.

Referring to the FIGURES in general, and to FIG. 3 in particular, operation of the filtration apparatus will now be described. Upon initial operation of the filtration apparatus, a user places the apparatus on a counter top or the like supporting surface and mates the electrical power supply cord with a household receptacle to supply electrical energy to the apparatus. Next, by grasping knob 36 and separating lid 34 from the remainder of container 15, a sufficient amount of water is poured or otherwise supplied to the container.

By grasping handle 176, a user can remove the container of the base module for transport to a remote location, such as a sink where a faucet connected to a water supply can be used to fill the container 14, the lid 34 thereof first having been removed. When filled, the container is carried back to the base module and is lowered against the top wall thereof, establishing mating communication between the plug portions of the valves mounted in the container and the sockets extending from the base module. With the snap lock feature provided by locks 192, a user has a visual and audible indication that the valves of the container are fully mated with the base and that the valves are open, in preparation for operation of the filtration apparatus.

With the water supply connected to the inlet of pump 62 through conduit 56, supply water can be flowed in the direction of arrow 400 (see FIG. 3). By depressing switch 110, operation of the filtration apparatus is initiated and lamp 118 is illuminated to provide a visual indication thereof. Electrical power is supplied through conductors 106,108 to energize the motor 63 and lamp 112 is illuminated to indicate the energized condition of the motor. Pump 62 receives the supply water 32 from container 14, discharging the water under sufficient pressure to perform the desired separation within the filter module 66. For purposes of illustration, in one practical embodiment, the pump output pressure ranged between 40 and 60 psi, sufficient to cause the desired separation within the filter module to drive product water into container 16, and to return concentrate to container 14.

It is important that the filtration module 66 have internal filtering components sufficiently efficient to allow not only the permeation of purified product water and return of concentrate to the supply water container under the force of pump 62, but also to drive the pure water through the conduit 78 into the pure water container 16. It is desirable that the extent of filtration accomplished on each pass through the module 66 be relatively high to avoid extended running time of the pump and to fill the container 16 with purified water as quickly as possible.

As mentioned above, the preferred filter mechanism within module 66 is a reverse osmosis membrane in which purified water permeate is produced at outlet 74, while the dissolved soluble salts, organic molecules and any suspended particulate matter of the supply water is carried to outlet 76 by the portion of the supply water not passing through the membrane. The purified water appearing at outlet 74 is carried in the direction of arrow 404 under the pressure of pump 62, passing through conduit 78 and valve 86 into container 16 where the purified water is accumulated. The concentrate appearing at outlet 76 is forced by pump 62 in the direction of arrows 408, passing through conduit 100 and valve 52 so as to flow into the water supply container 14 mixing with the water 32 contained therein.

The product water in conduit 78 may be tested for a relative purity level in a test device generally indicated at 412. The test device preferably comprises a conductivity cell 414 of a type sending an electrical signal through conductors 416 to the meter 122. The conductivity cell preferably measures the conductivity of the product water to thereby indirectly indicate the level of purity of the filtered water exiting module 66 and being stored in container 16.

The concentrate flowing through conduit 100 and mixing with the supply water 32 is recirculated, entering the extension tube 50 and being drawn through conduit 56 to the inlet of pump 62. The concentrate is however diluted before being recirculated through the filtration circuit. As increasing amounts of the supply water permeate through the filer and accumulate in the purified water container 16, the concentration of salt in the supply water container 14 slowly increases. Alternative arrangements are illustrated for discontinuing operation of the filtration apparatus when a desired level is reached. For example, if the volume size of containers 14,16 is closely matched, container 16 will eventually be filled, while container 14 will be emptied, leaving only a small amount of concentrate solution in the lower portion thereof. The container 16, when filled with purified water, can be withdrawn to a remote location for use thereat. For example, the container 16 can be stored in a refrigerator to provide a convenient supply of purified drinking water. Thus, by closely sizing containers 14,16 and avoiding refilling the supply water in container 14, a user is assured that the purified water container 16 will not be overfilled. However, the problem of deenergizing pump 62 remains.

The preferred arrangement for providing automatic shut-off includes an electrical conductivity test device 420 which tests the water entering pump 62 and sends an electrical signal through conductors 422 to the solenoid 116. When the water level in container 14 drops below the top of extension 50 air is drawn past the conductivity test device 420, and the signal sent to solenoid 16 drops sharply. Solenoid 116 is preferably connected so that it opens upon sensing a drop in conductivity, thereby deenergizing the power supply to pump motor 63. If desired, a reset switch (not shown) can be installed to override the operation of solenoid 116. However, it is generally preferred that a surging operation of the pump associated with varying water levels in container 14 be prevented, and the above-described arrangement of the solenoid and conductivity sensor 420 provides this function. As indicated above, the electrical conductivity test device 420 and solenoid 116 can be connected so as to also discontinue pump operation upon the indication of abnormally high salt concentration in container 14. Such, however, has not been found to be necessary.

The final brine solution in container 14 is disposed of by removing the container to a remote location such as a sink where the container can be flushed with clean water from a sink faucet, for example. It has been found convenient to replenish the water supply in container 14 at this time, the container being returned to the base module for subsequent operation of the filtration apparatus. If two containers 16 are provided with each filtration apparatus the second, empty container 16 can be installed. With a fresh supply of water supplied to the sensor 420, an intermediate conductivity value is detected and causes solenoid 116 to close, thereby resuming operation of pump 62 and initiating the filtration of the fresh batch of supply water in container 14.

The above-described shut-off mechanism, where the conductivity sensed in device 420 drops dramatically to cause an opening of solenoid 116, can be replaced with any conventional shut-off mechanism suitable for the intended purpose. For example, a float with an on-off switch can be installed within container 14 with separable connection leads mating with leads in the base of the filtration apparatus and connected to circuitry to control operation of the pump. Such, however, is generally not preferred because of the presence of electrical components within the supply water container and because of the associated increased cost.

Although such has not found to be necessary, a shut-off for the pump can also be installed in the purified water container 16 and the supply water container can be made several times larger in capacity than the capacity of container 16. However, the arrangement described above wherein the containers 14,16 are approximately the same size and wherein conductivity sensor 420 trips solenoid 116, has been found to be the simplest and most efficient mode of operation.

The filtration apparatus according to aspects of the present invention is relatively compact and lightweight, resembling many counter top electrical appliances in popular use today.

For purposes of illustration but not limitation, one practical embodiment of filter apparatus according to the present invention included containers 14,16 generally cubic in configuration and measuring five inches on a side, each container holding approximately one-half gallon of water. The filtration apparatus is, except for the connection of an optional electrical plug, completely self-supporting and independent of any utilities, such as a water supply or a drain typically provided at a sink having a faucet. The filtration apparatus is particularly suitable for operation in nearly any part of a kitchen area since the containers for the supply water and purified water are lightweight and easily transported to a sink.

It will thus be seen that the objects hereinbefore set forth may readily and efficiently be attained and, since certain changes may be made in the above-construction and different embodiments of the invention without departing from the scope thereof, it is intended that all matter contained in the above description or shown in the accompanying drawings shall be interpreted as illustrative and not in a limiting sense.

What is claimed is:

1. Apparatus for providing purified water for drinking purposes, which apparatus comprises
    a base compartment containing a pump and electrically powered drive means connected to said pump and a water treatment device containing a filter with an average pore size of about 0.5 micron or less and having an inlet, a pure water outlet, and a concentrate outlet,
    a supply container for holding a quantity of tap water or the like,
    a purified water container,
    said containers being adapted to be supported atop said base compartment,
    detachable first connection means in the upper surface of said base compartment and in the undersurface of said supply container for allowing liquid flow from said supply compartment to said base, first conduit means connecting said first connection means to the suction side of said pump, means connecting said pump discharge to the inlet of said water treatment device, detachable second connection means interconnecting said base and said supply container for returning concentrate to said supply container, second conduit means connecting said second connection means to said concentrate outlet from said treatment device, detachable third connection means interconnecting said purified water container and said base compartment so as to permit the flow of purified water therebetween, third conduit means connecting said third connection means to said purified water outlet from said treatment device, said first, second and third connection means each containing valve means which prevent outflow of liquid therethrough upon separation of said respective container from said base compartment, and means for halting operation of said pump drive means upon reaching a certain predetermined condition.

2. Apparatus in accordance with claim 1 wherein said supply container includes standpipe means surrounding an entry to said first connection means whereby a minimum level of concentrate is assured to remain in said supply container.

3. Apparatus in accordance with claim 2 wherein said standpipe means is removably intergagingly connected to said supply container and a plurality of interchangeable standpipes of different lengths are provided.

4. Apparatus for providing purified water for drinking purposes, which apparatus includes three separably interconnectable subassemblies, and comprises a first subassembly comprising a base compartment containing a pump, an electrically powered drive means connected to said pump and a water treatment device containing a filter with an average pore size of about 0.5 micron or less and having an inlet, a pure water outlet, and a concentrate outlet, a second subassembly comprising a supply container for holding a quantity of tap water or the like, a third subassembly comprising a purified water container, said supply and said purified water containers being adapted to be releasably supported by said base compartment, detachable first connection means in an outer surface of said base compartment and in an outer surface of said supply container for forming a fluid-tight passageway for liquid flow from said supply compartment to said base, first conduit means in said base compartment connecting said first connection means to the suction side of said pump, means in said base compartment connecting said pump discharge to the inlet of said water treatment device, detachable second connection means in outer surfaces of said base compartment and said supply container, interconnecting said base and said supply container with a fluid-tight passageway for returning concentrate to said supply container, second conduit means in said base compartment connecting said second connection means to said concentrate outlet from said water treatment device, detachable third connection means in outer surfaces of said base compartment and said purified water container interconnecting said purified water container and said base compartment with a fluid-tight passageway for a flow of purified water therebetween, third conduit means in said base compartment connecting said third connection means to said purified water outlet from said treatment device, said first, second and third connection means each including valve means associated with a respective passageway which prevent outflow of liquid from the associated container upon separation of said respective container from said base compartment, and means for halting operation of said pump drive means upon reaching a certain predetermined condition.

5. The apparatus of claim 4 wherein said first connection means includes valve means having a valve member, a valve seat, and a spring for biasing said valve member against said valve seat in an outward direction.

6. The apparatus of claim 5 wherein said first connection means includes an outwardly protruding post on an outer surface of said base compartment, engageable with said valve member when a container carrying said valve member is supported by said base compartment so that said valve member is urged away from the valve seat to establish a flow communication between the container and the base member.

7. The apparatus of claim 6 further comprising snap lock means for maintaining engagement between said container and said base member, so as to withstand the spring bias force of said automatically closing valve means.

8. The apparatus of claim 7 wherein the supply container comprises floor means with a sidewall extending upwardly therefrom to form a liquid-containing vessel, said valve means being associated with the container floor and wherein the snap-lock means in the container and the base compartment prevents an upward dislocation of said container away from the base compartment.

9. The apparatus of claim 7 wherein the containers comprise a floor and a sidewall extending above the floor so as to form a liquid-containing vessel, said valve means being associated with the container sidewalls, and said base compartment includes a generally upstanding panel having an outer surface carrying portions of the first, second and third connection means cooperating with valve means of the first and second containers to form water-tight connections therewith, said base compartment further comprising a protruding stop wall engageable with a portion of the container sidewall to prevent dislocation of said automatically closing valve means away from said upstanding panel.

10. The apparatus of claim 5 wherein said treatment device contains a polymeric semipermeable membrane filter and wherein said pump supplies supply water under sufficient pressure to the semipermeable membrane to cause pure water to permeate through said membrane and to cause impurity-containing water to flow through said detachable second connection means into said supply container.

11. The apparatus of claim 10 wherein said supply container includes standpipe means surrounding an entry to said first connection means whereby a minimum level of concentrate is assured to remain in said supply container.

12. The apparatus of claim 11 wherein said standpipe means is removably interengagingly connected to said supply container and a plurality of interchangeable standpipes of different lengths are provided.

13. The apparatus of claim 5 further comprising water quality test means responsive to water flowing into said pump and producing an electrical signal in response thereto, the apparatus further comprising circuit interrupting means for interrupting the electric power to the pump drive means, electrical conductors connecting the water quality test device and the circuit interrupting means, and the water quality test means responsive to the absence of water flowing in the pump to initiate a signal indicative thereof, and said circuit interrupting means responsive to said signal to interrupt the electric power to said pump drive means.

* * * * *

UNITED STATES PATENT AND TRADEMARK OFFICE
CERTIFICATE OF CORRECTION

PATENT NO. : 4,842,724
DATED : June 27, 1989
INVENTOR(S) : Donald T. Bray et al.

It is certified that error appears in the above-identified patent and that said Letters Patent is hereby corrected as shown below:

Column 4, lines 55-56, delete "to concentrate outlet 76 by water which does not flow".

Column 4, line 59, after "carried", insert: --to concentrate outlet 76 by water which does not flow--.

Column 8, line 35, correct the spelling of --threshold--.

Column 9, line 60, correct the spelling of --threshold--.

Column 11, line 18, change "filer" to --filter--.

Column 12, line 16, after "not", insert --been--.

Column 13, line 30, change "intergagingly" to --interengagingly--.

Signed and Sealed this

Twenty-fourth Day of July, 1990

Attest:

HARRY F. MANBECK, JR.

*Attesting Officer*     *Commissioner of Patents and Trademarks*